(12) United States Patent
Alber et al.

(10) Patent No.: US 10,654,016 B2
(45) Date of Patent: May 19, 2020

(54) APPARATUS AND A METHOD FOR THE PREPARATION OF A PLAY, CRAFT AND/OR TOY COMPOUND

(71) Applicant: WeCool Toys Inc., Point Pleasant, NJ (US)

(72) Inventors: Ross Alber, Medford, NJ (US); Jeffrey Osnato, Medford, NJ (US)

(73) Assignee: WECOOL TOYS INC., Medford, NJ (US)

( * ) Notice: Subject to any disclaimer, the term of this patent is extended or adjusted under 35 U.S.C. 154(b) by 0 days.

(21) Appl. No.: 16/285,531

(22) Filed: Feb. 26, 2019

(65) Prior Publication Data

US 2019/0184354 A1  Jun. 20, 2019

Related U.S. Application Data

(62) Division of application No. 15/650,111, filed on Jul. 14, 2017.

(30) Foreign Application Priority Data

Apr. 18, 2017  (GB) .................................. 1706076.5

(51) Int. Cl.
*B01F 15/00*   (2006.01)
*B01F 15/02*   (2006.01)
(Continued)

(52) U.S. Cl.
CPC ....... *B01F 15/0087* (2013.01); *A63H 33/001* (2013.01); *B01F 3/1214* (2013.01);
(Continued)

(58) Field of Classification Search
CPC ............ B01F 15/0087; B01F 15/00506; B01F 15/00512; B01F 15/00785; B01F 15/0227;
(Continued)

(56) References Cited

U.S. PATENT DOCUMENTS 802,199 A * 10/1905 Cross .................. B01F 7/00208
366/312
3,738,619 A   6/1973 Shirae
(Continued)

FOREIGN PATENT DOCUMENTS

EP       1210974 A2   6/2002
JP      2002191307 A  7/2002

OTHER PUBLICATIONS

Spangler, Steve, "Gak—Elmer's Glue Borax Recipe", www.stevespanglerscience.com/lab/experiments/glue-borax-gak/, published Jul. 5, 2013, accessed via Internet Archive Wayback Machine.*
Children's Museum of Houston, "Guar Gum Slime", www.cmhouston.org/guar-gum-slime, published Sep. 6, 2015, accessed via Internet Archive Wayback Machine.*
Oobleck—The Corn Starch and Water Experiment, https://web.archive.org/web/20150531052319/https://sciencebob.com/oobleck-the-corn-starch-and-water-experiment/, accessed via Wayback Machine, dated May 31, 2015.*
(Continued)

*Primary Examiner* — Marc C Howell
(74) *Attorney, Agent, or Firm* — McKee, Voorhees & Sease, PLC

(57) ABSTRACT

There is provided an apparatus and a method for producing a play compound and the play compound itself which, in one embodiment is a compound which sufficiently fluid to be pliable and is typically cold and slimy to the touch. The apparatus and a method provide a powder and liquid to a user, which can be a non-skilled person and thereby allow the mixing of the powder and liquid together by that person to form the play compound outside of a factory environment whilst ensuring that the play compound which is formed has the desired characteristics. Most typically the user which performs the mixing can be the end user, such as a child, who will play with the compound and so the formation of the play compound forms a new part of the play experience.

16 Claims, 4 Drawing Sheets

(51) Int. Cl.
  *B01F 13/00* (2006.01)
  *B01F 3/12* (2006.01)
  *A63H 33/00* (2006.01)
  *B01F 7/00* (2006.01)
  *B01F 7/16* (2006.01)
  *B01F 17/00* (2006.01)

(52) U.S. Cl.
  CPC ........ *B01F 3/1221* (2013.01); *B01F 7/00258* (2013.01); *B01F 7/165* (2013.01); *B01F 13/0033* (2013.01); *B01F 15/00506* (2013.01); *B01F 15/00512* (2013.01); *B01F 15/00785* (2013.01); *B01F 15/0227* (2013.01); *B01F 17/0028* (2013.01); *B01F 17/0064* (2013.01); *B01F 2215/0036* (2013.01)

(58) Field of Classification Search
  CPC .. B01F 3/1214; B01F 3/1221; B01F 13/0033; B01F 7/00258; B01F 7/165; B01F 17/0028; B01F 17/0064; A63H 33/001
  USPC .......................................................... 366/130
  See application file for complete search history.

(56) References Cited

U.S. PATENT DOCUMENTS

| | | | |
|---|---|---|---|
| 6,758,592 B2 * | 7/2004 | Wulf | A47J 43/042 |
| | | | 215/228 |
| 2002/0067658 A1 | 6/2002 | Vendrely et al. | |
| 2003/0112701 A1 | 6/2003 | Burchett | |
| 2003/0174576 A1 | 9/2003 | Tague et al. | |
| 2009/0129200 A1 | 5/2009 | Breviere et al. | |
| 2010/0064940 A1 * | 3/2010 | Wijerama | C08L 29/04 |
| | | | 106/287.26 |
| 2015/0231580 A1 | 8/2015 | Henry et al. | |

OTHER PUBLICATIONS

WeCool Toys, Inc., PCT/IB2018/000398, "International Search Report", dated Apr. 18, 2018.

* cited by examiner

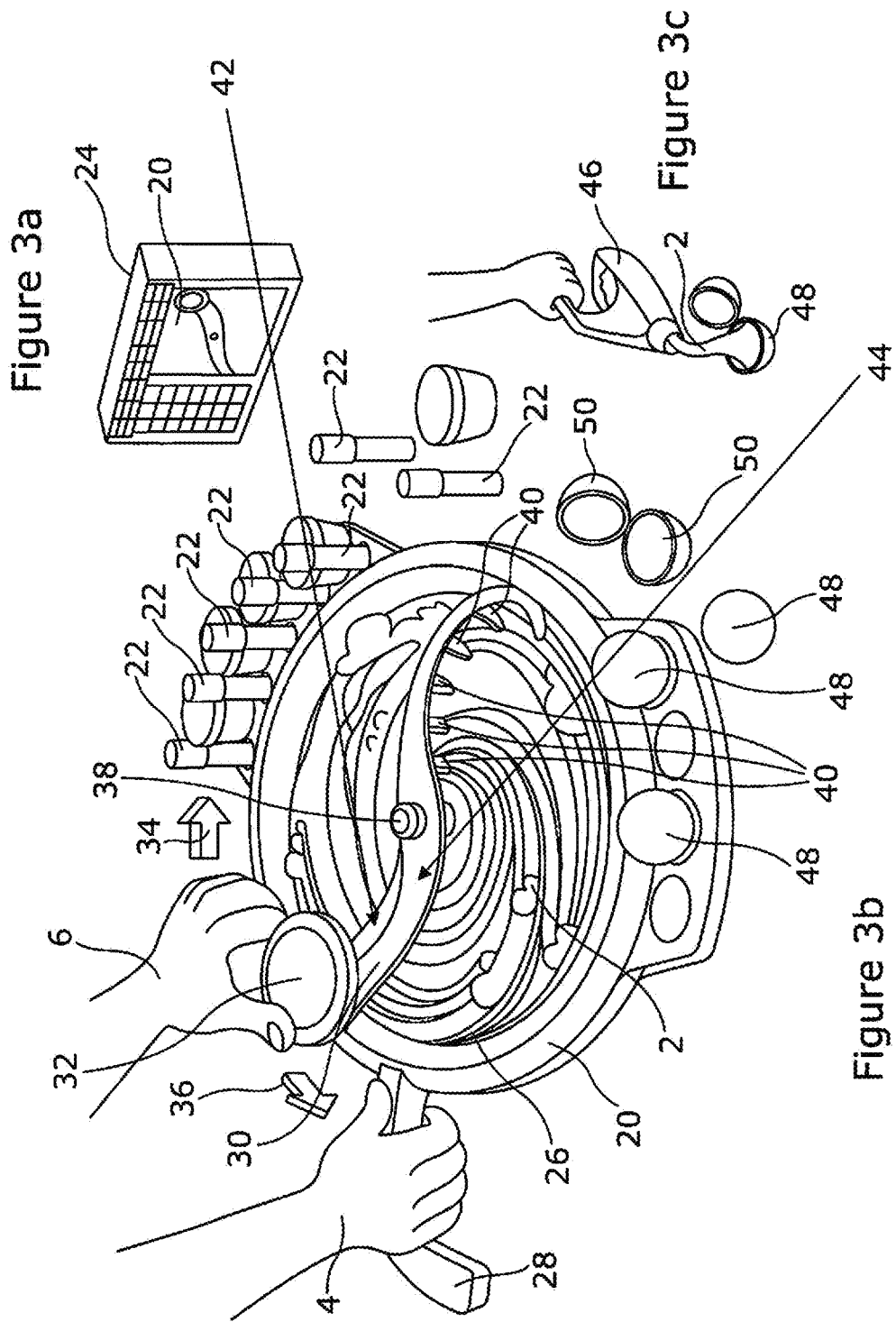

APPARATUS AND A METHOD FOR THE PREPARATION OF A PLAY, CRAFT AND/OR TOY COMPOUND

CROSS-REFERENCE TO RELATED APPLICATIONS

This United States patent application is a divisional patent application claiming priority to U.S. patent application Ser. No. 15/650,111, filed Jul. 14, 2017. U.S. patent application Ser. No. 15/650,111 claims priority to British Patent Application No. 1706076.5 filed Apr. 18, 2017. These patent applications are herein incorporated by reference in their entirety, including without limitation, the specification, claims, and abstract, as well as any figures, tables, appendices, or drawings thereof.

STATEMENT REGARDING FEDERALLY SPONSORED RESEARCH

Not applicable

NAMES OF PARTIES TO JOINT RESEARCH AGREEMENT

Not applicable

REFERENCE TO SEQUENCE LISTING

Not applicable

BACKGROUND OF THE INVENTION

The invention to which this application relates is apparatus and a method for the manufacture and preparation of a compound which can subsequently be used in a play and/or craft environment and as a toy and used independently or in conjunction with other toys and/or apparatus.

In particular, although not necessarily exclusively, the compound to which the application relates is a material of the type for use in play and/or crafts, and is hereonin referred to in a non-limiting manner as a play compound. The play compounds of this type conventionally include a cross-linked polymer, such as an adhesive, such as white glue, and which is manufactured under factory conditions by combining polyvinyl alcohol solutions with borate ions. The compound can be odourless or a particular odour can be added to the same and the compound, which is liquid or at least semi fluid, can be formed of a particular colour and is cold and slimy to the touch. The compound can also be referred to as a non-Newtonian fluid in that the viscosity of the fluid can be affected by factors other than temperature, such as, for example, by the application of a shear stress caused by any of squeezing, stirring, agitating or applying mechanical pressure to the compound. One form of this compound is sold under the registered Trade Mark Slime owned by Viacom.

While it is known to be able to form other similar types of compound in the home rather than the factory environment, these compounds can be difficult to make, can require a relatively long list of ingredients and/or ingredients such as Borate which are difficult to obtain, at least in certain countries and, most often, do not lead to the production of a compound which acts in the same manner as the factory made versions of the compound and, as such, it is found that the compound, once made, is generally unsatisfactory in terms of its performance in comparison with the factory made versions.

However, despite the advantages of using factory made compositions, there are problems with the same in terms of the expense of purchasing the same and the feeling of detachment of the child in that they have not been able to take part in the making of the compound.

BRIEF SUMMARY OF THE INVENTION

The aim of the present invention is therefore to provide apparatus and a method for making a play compound of a type which, once formed, has similar qualities of use as an equivalent type of compound which is made under factory conditions, whilst the apparatus allows the compound to be made by a person in their home environment. A further aim is to provide the ingredients required to make the compound in a manner which allows the same to be used in the manufacture of the compound in a manner which can be used by children and in a safe manner. A further aim is to provide the ingredients in a form which allows a play compound to be formed in a factory or home environment and have predetermined characteristics.

In a first aspect of the invention there is provided apparatus to aid the formation of a play compound, said apparatus including a base, a cavity and mixing means which, when operated, cause agitation and mixture of the play compound components and a liquid located in the cavity, to form the play compound.

In one embodiment the apparatus base includes the cavity or receives an item in which the cavity is formed and the mixing means include an arm which is movable with respect to the base. In one embodiment the arm is rotatable.

In one embodiment the arm includes at least one, or a number of portions which are located with respect to the cavity so as to cause an agitating, and hence mixing, effect on the liquid and components which are located in the cavity at that time. In one embodiment the said components are provided in a powder form which is premixed and a liquid is also present in the cavity to be mixed with the powder.

In one embodiment the said arm includes one or more ports through which the powder can be poured to introduce the same for mixing with the liquid in the base. In one embodiment the powder is introduced as the arm is moved.

In one embodiment the apparatus includes one or more capsules into which the formed play compound can be placed and stored prior to subsequent use.

In one embodiment the powder is provided in a predetermined quantity such that when the user adds the full quantity to a predetermined quantity of water then they can be confident that a play compound with predetermined characteristics will be formed.

In one embodiment the apparatus includes a plurality of different powder types which can be selectively used alone or in combination to form a particular play compound. In one embodiment the powders may differ in terms of any or any combination of colour, consistency, ingredients, additional components such as glitter, and the like.

In a further aspect of the invention there is provided apparatus for use in the formation of a play compound by mixing a powder and water, said apparatus including a base, a cavity included in, or received by, the base in which the powder and liquid are mixed and wherein a mixing means is provided in a form such that relative rotational movement of the base and at least an arm of the mixing means causes agitation and mixing of the powder and liquid together to form the play compound.

In one embodiment the said relative movement is caused by the application of a manual movement force on a handle of the mixing means located externally of the cavity. Alternatively a powered movement means can be provided.

Typically the handle extends through an aperture in a lid and into the cavity to perform the mixing and the lid prevents spillage of the liquid and/or powder as the same are mixed to form the play compound.

Typically the lid is selectively removable from the cavity to allow access to be gained to introduce the liquid and powder and/or remove the formed play compound.

In one embodiment the movement means are provided as an arm which is rotatably movable with respect to the base about a substantially central axis of the cavity.

In one embodiment the arm includes at least one portion which is located with respect to the base so as to cause an agitating, and hence mixing, effect on the liquid and ingredients which are located in the base at that time. In one embodiment the said ingredients are provided in a powder form which is premixed.

In one embodiment the said arm includes one or more ports through which the powder can be poured to introduce the same for mixing with the liquid in the base. In one embodiment the powder is introduced as the arm is moved and thereby allows the powder to be introduced to the liquid in a manner which reduces the risk of lumping.

In one embodiment the apparatus includes one or more capsules into which the formed play compound can be placed and stored prior to subsequent use.

In one embodiment the apparatus includes containers for a plurality of different powder types which can be selectively used, alone or in combination, to form a particular play compound. In one embodiment the powders may differ in terms of any, or any combination of colour, consistency, ingredients, additional components such as glitter, and the like.

In a further aspect of the invention there is provided a play compound said play compound formed by adding a powder with a liquid into a cavity of a container, said powder including a plurality of components required to form the play compound and mixing the powder and liquid for a period of time sufficient to cause the play compound to be formed.

In one embodiment the mixing is performed by a person grasping and moving, typically by shaking, the container.

In another embodiment the mixing is performed by a person operating mixing means.

In a further aspect of the invention there is provided a method for the manufacture of a play compound which is pliable in use, said method comprising the steps of adding a quantity of a powder composition to a liquid in a cavity, and applying an agitating force to cause the mixing of the powder and liquid for a period of time so as to cause the said play compound to be formed.

In one embodiment the powder is formed under factory conditions to include the ingredients which are required in predefined percentages and the powder is then provided to a person to be used in conjunction with the liquid.

In one embodiment the liquid is water.

In one embodiment the user is provided with instructions relating to the ratio of the powder to water in the mixture. In one embodiment a range of ratios are provided and the person can select which ratio to use at the time of manufacture.

In one embodiment a specific mixing container is provided and the container has marked thereon one or more levels which indicate the quantity of liquid and/or powder which should be poured into the container in order to form a suitable play compound with specific characteristics.

In one embodiment each ratio is linked to a particular composition of the play compound which will be formed. For example, if there is a greater quantity of powder added to an amount of liquid, then the play compound will have greater viscosity and/or other characteristic and if a smaller quantity of powder is added to the amount of liquid the play compound will have a lower viscosity and/or other characteristic.

In one embodiment each of the compounds is linked to a particular identifiable type or characteristic of play compound such as, clay, dough, rubber, certain resins, sand, gel, slimy substance and/or other art/craft compound.

In one embodiment the specific ingredients contained within the compound are provided in a set percentage level under factory conditions and converted into a powder under factory conditions such that the user is only required at the time of making the compound to add the supplied powder to water in a ratio which is predetermined in order to make the play compound with the user selected characteristics.

In one embodiment the powder contains a combination of the following ingredients Gum, such as Guar gum, Borax, a suitable colour pigment or combination of colour pigments, starch, a phosphate such as Sodium Hydrogen phosphate, an ethanol, and an acetate such as Sodium dehydroacetate.

In one embodiment Borax or a borate is not included.

In one embodiment a further component includes one or more colour pigments and/or other components to provide a visual or tactile effect.

It should also be appreciated that although the method as herein described is particularly suited to allowing the play compound to be effectively formed by an end user, without the need of factory scale apparatus, the method can be used to advantage with all of the steps being performed under factory conditions for the large volume manufacture of the play compound.

BRIEF DESCRIPTION OF THE DRAWINGS

Specific embodiments of the invention are now described with the reference to the accompanying diagrams; wherein

FIGS. 3a-d illustrate features of an embodiment of apparatus for use in forming the play compound in accordance with the invention.

DETAILED DESCRIPTION OF THE INVENTION

Figure 1C:
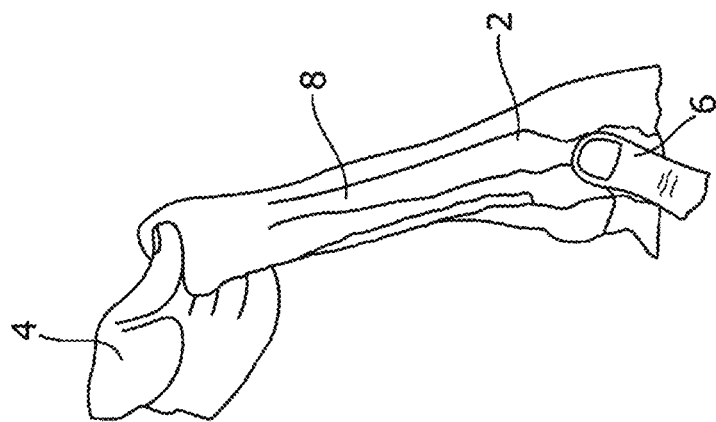
FIGS. 1a-c illustrate a play compound in accordance with one embodiment of the invention.
Figure 1B:
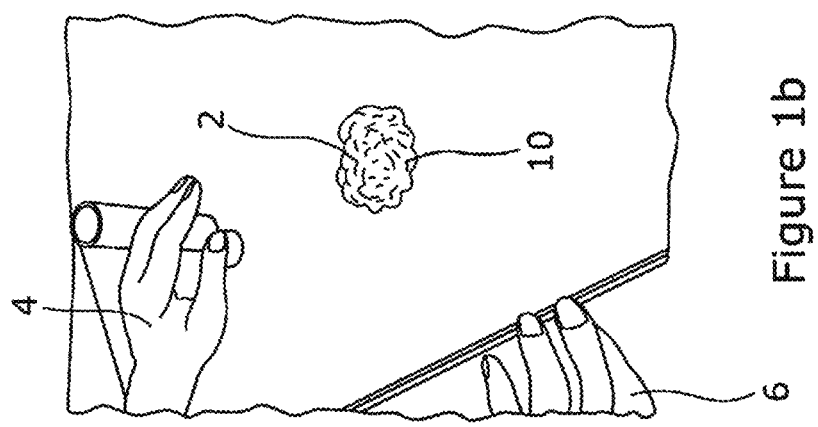
Figure 1A:
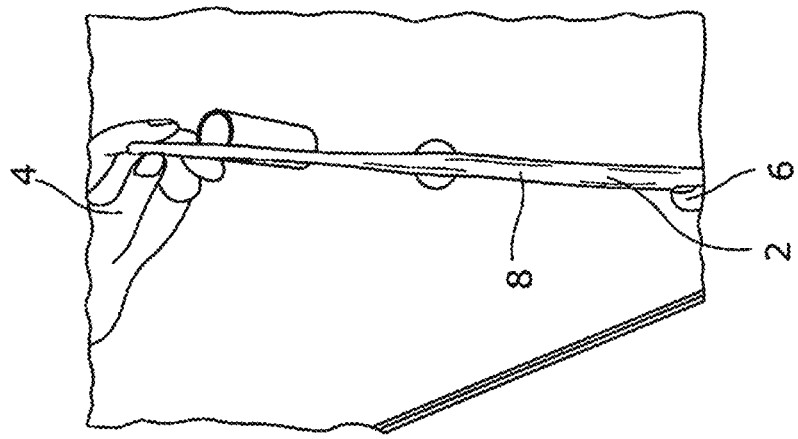

Referring firstly to FIGS. 1a-c there is illustrated a play compound 2 in accordance with one embodiment of the invention. The play compound is shown being manipulated by a user's hands 4,6 to take selected forms such as a stretch form 8 shown in FIGS. 1a and c and a ball form 8 shown in FIG. 1b and it will be appreciated that the compound, once moved into a particular shape has tendency to stay in that shape until further manipulated by the user. It is found that this type of compound, and the manipulation of the same can provide entertainment for many hours to children and therefore is a popular plaything.

Figure 2A:
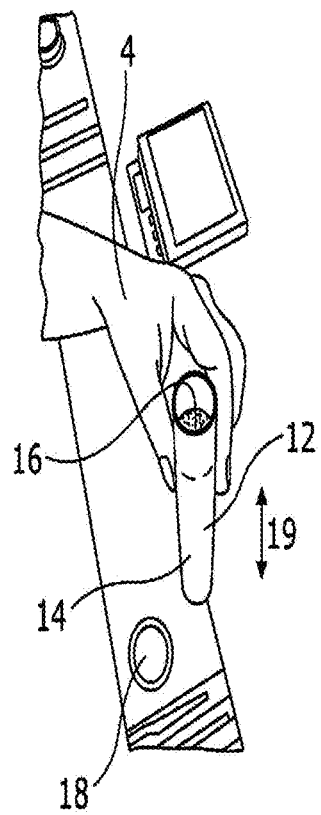
FIGS. 2a-c illustrate one embodiment of the method of formation of a play compound in accordance with the invention.
Figure 2B:
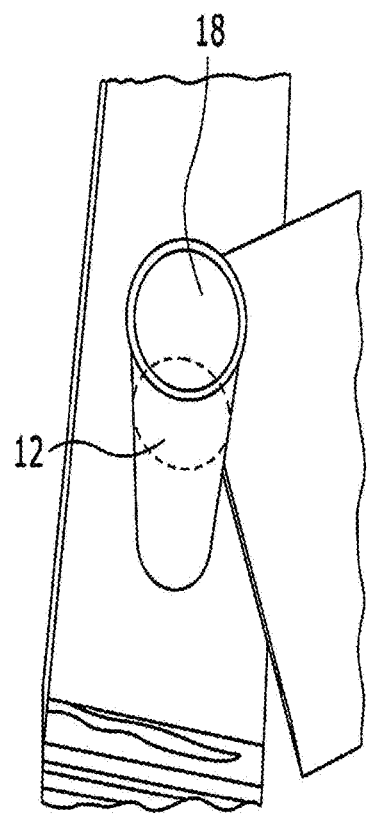
Figure 2C:
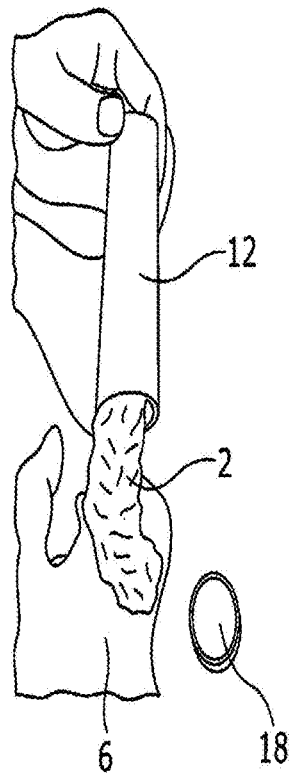

FIGS. 2a-c illustrate one embodiment of the method of forming the play compound 2 in accordance with the invention. In this embodiment a container in the form of a jar 12 is provided and into the jar is poured a quantity of water 14. Also poured into the jar is a quantity of a premixed powder 16 which includes the ingredients required, and the percentages which are required, in order to form the play compound 2. As shown in FIG. 2a the powder initially lies on top of the water 14. When the powder and water are located in the jar, the lid 18 is placed on the opening in the jar to seal the same and the jar is then shaken so as to cause the water and powder to mix. The shaking and mixing is performed for a period of time and after this the powder and liquid have mixed as shown in FIG. 2b. The jar may be provided with markings thereon which have one or more levels marked on the same which indicate the quantity of liquid and/or powder which should be poured into the container in order to form a suitable play compound with specific characteristics when the powder and liquid are mixed together in the jar.

In addition to the mixing, the mixture has also changed condition into the consistency of the play compound which is illustrated in FIG. 2c being pulled out of the jar by the persons finger of their hand 6. Once in the consistency then the same can be manipulated as illustrated in FIGS. 1a-c.

Figure 3D:
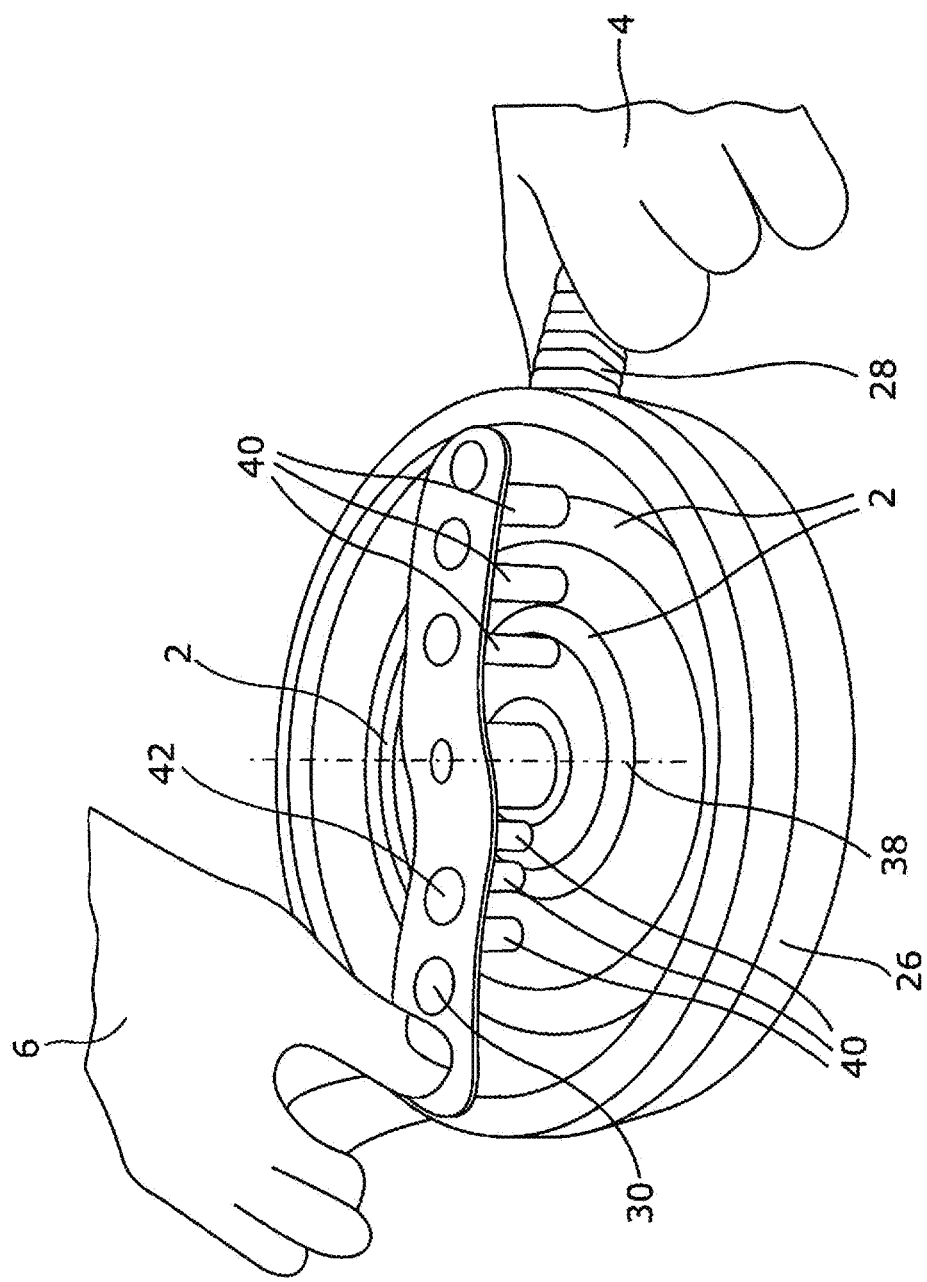

Turning now to FIGS. 3a-d there is illustrated apparatus in accordance with one embodiment of the invention which can be used to form the play compound. It is envisaged that the apparatus 20 will be provided along with one or more containers 22 of the powder as part of a retail pack 24, an example of which is shown in FIG. 3a.

FIGS. 3b and d illustrate two forms of the apparatus 20 in greater detail. It will be seen that the apparatus includes a base 26 with a handle 28 which allows the same to be gripped by the hand 4 during use. The base is provided in the form of a bowl in which the powder and water is added and subsequently the play compound 2 is formed. A mixing means in the form of an arm 30 which is provided with a handle 32 to be gripped by the user's other hand 6. The arm is attached to the base and provided to be rotatable as indicated by arrows 34, 36 about an axis 38 provided centrally of the base 26. The arm has depending downwardly from the same and towards the base, a series of mixing members 40 which depend into the powder and water and serve to mix the same together as the arm is rotated.

The arm is also provided with one or more ports or cavities 42 which allow the pouring of the powder through the same and into the bowl and ports or cavities 44 which allow the pouring of the water through the same and into the bowl. These allow the powder and water to be introduced into the bowl in a measured and spread manner and thereby reduce the tendency of the powder and water to form lumps during the mixing process.

Once the arm has been rotated for a sufficient time as to cause the play compound to be created from the powder and water the same can be removed from the base, in one embodiment using a funnel 46 as shown in FIG. 3c and poured into one or more capsules 48 which are typically formed of two parts 50, 52 and once the capsule has been filled with sufficient of the play compound the parts 50, 52 are sealed to thereby enclose the play compound 2 in the same and hence maintain the consistency of the play compound until it is desired to be used for play.

It should be appreciated that the apparatus can take any suitable form and may in one embodiment be shaped to match an animal, cartoon character or other format.

There is therefore provided in accordance with the invention apparatus and a method for producing a play compound which allows the play compound to be made by a non-skilled person and outside of a factory environment whilst ensuring that the play compound which is formed has the desired characteristics.

The invention claimed is:

1. A method of using play compound components comprising:
mixing a powder comprising a starch, a gum, and borax, with an additional play compound component selectively added to provide a visual and/or tactile effect, and a liquid in a cavity of a container for a period of time to form a play compound; wherein the powder further comprises an acetate, a phosphate, or a mixture thereof.

2. The method according to claim 1 wherein the play compound is formed with an apparatus comprising:
a base including or receiving thereon the container; and
an arm which, when operated, rotates about an axis located on a center axis of the cavity, thereby causing agitation and mixture of the play compound components located within the cavity.

3. The method according to claim 1 further comprising storing the play compound in a pliable form.

4. The method according to claim 1 wherein the play compound is stored within a storage means of an apparatus in the pliable form until the play compound is selectively removed for play.

5. The method according to claim 1 further comprising forming the play compound into a stretch form.

6. The method according to claim 1 further comprising forming the play compound into a ball form.

7. The method according to claim 1 wherein the liquid is water.

8. The method according to claim 1 wherein components of the powder are formed together under factory conditions in predefined percentages before the powder is mixed with the liquid.

9. The method according to claim 1 wherein the user is provided with a range of ratios for mixing the powder and the liquid and the user selects which ratio to use at the time of mixing to thereby select the consistency of the play compound which is formed.

10. The method according to claim 1 wherein the quantity of the powder and the quantity of the liquid which are used are selected with respect to indicators marked on the container.

11. The method according to claim 1 wherein the powder further comprises one or more of the following components selected from the group consisting of; Guar gum, a colour pigment of combination of colour pigments, and an ethanol.

12. The method according to claim 1 wherein the phosphate is Sodium Hydrogen Phosphate and/or the acetate is Sodium dehydroacetate.

13. The method according to claim 1 wherein the powder comprises a phosphate.

14. The method according to claim 1 wherein the powder comprises an acetate.

15. The method according to claim 1 wherein the powder comprises a phosphate and an acetate.

16. The method according to claim 15 wherein the powder further comprises an ethanol.

* * * * *